United States Patent
Allison

(10) Patent No.: US 6,998,098 B2
(45) Date of Patent: Feb. 14, 2006

(54) REMOVAL OF GASES FROM A FEED

(75) Inventor: Joe D. Allison, Ponca City, OK (US)

(73) Assignee: Conocophillips Company, Bartlesville, OK (US)

( * ) Notice: Subject to any disclaimer, the term of this patent is extended or adjusted under 35 U.S.C. 154(b) by 52 days.

(21) Appl. No.: 10/292,030

(22) Filed: Nov. 11, 2002

(65) Prior Publication Data
US 2004/0091409 A1 May 13, 2004

(51) Int. Cl.
B01J 8/00 (2006.01)

(52) U.S. Cl. ............... 423/210; 423/220; 423/237; 423/245.2

(58) Field of Classification Search ........... 423/210, 423/220, 230, 237, 239.1, 245.1
See application file for complete search history.

(56) References Cited

U.S. PATENT DOCUMENTS

| | | | |
|---|---|---|---|
| 4,189,307 A | 2/1980 | Marion | 48/197 R |
| 4,284,423 A | 8/1981 | Eakman et al. | 62/28 |
| 4,536,382 A | 8/1985 | Blytas | 423/437 |
| 4,761,164 A * | 8/1988 | Pez et al. | 95/44 |
| 5,160,413 A | 11/1992 | Allison | 203/35 |
| 5,207,877 A * | 5/1993 | Weinberg et al. | 423/210 |
| 5,319,924 A | 6/1994 | Wallace et al. | 60/39.02 |
| 5,322,617 A | 6/1994 | De Bruijn et al. | 208/108 |
| 5,647,227 A | 7/1997 | Lokhandwala | 62/624 |
| 5,968,465 A | 10/1999 | Koveal et al. | 423/236 |
| 5,980,858 A | 11/1999 | Fujimura et al. | 423/655 |
| 6,090,356 A | 7/2000 | Jahnke et al. | 423/210 |
| 6,207,121 B1 | 3/2001 | Rooney | 423/228 |

FOREIGN PATENT DOCUMENTS

WO    WO 99/14473    3/1999

* cited by examiner

Primary Examiner—Edward M. Johnson
(74) Attorney, Agent, or Firm—Conley Rose P.C.

(57) ABSTRACT

A process is presented for separating and removing acid gases or base gases from a feed gas by use of a gas permeable membrane and a permeate comprising a treatment solution. The treatment solution in the permeate is caustic or acidic and reacts with the base or acid gases respectively to form salts so as to facilitate their removal from the feed gas. The acid gas in an acid feed gas may include HCN, $H_2S$, $CO_2$, COS and/or $NO_x$. The base gas in a base feed gas may include $NH_3$. In another aspect of the present invention, an apparatus for treating a feed gas containing an acid or a base gas comprises a feed gas passage; a treatment solution container containing a treatment solution; and a gas permeable membrane.

58 Claims, No Drawings

REMOVAL OF GASES FROM A FEED

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

A process is presented that relates to the field of removing acid or base gases from a feed gas. In particular, the present process makes use of a gas permeable membrane in conjunction with a caustic or acidic solution. More particularly, the process utilizes a caustic or an acidic solution, separated from the feed gas by a gas permeable membrane, to react with the base gases, such as, for example, ammonia ($NH_3$), or acid gases, such as, for example, hydrogen cyanide (HCN), hydrogen sulfide ($H_2S$), carbon dioxide ($CO_2$), carbon oxysulfide (COS) and oxides of nitrogen ($NO_x$), to form salts, thereby facilitating the removal of the base gas or the acid gas from the feed gas. In another aspect of the present invention is presented an apparatus for treating a feed gas containing an acid or a base gas wherein the apparatus comprises a feed gas passage; a treatment solution container containing a treatment solution; and a gas permeable membrane.

BACKGROUND OF THE INVENTION

Feed gases that result from the processing of crude carbonaceous or hydrocarbonaceous fossil fuels are often contaminated with certain undesirable components. These undesirable components are native to the crude carbonaceous or hydrocarbonaceous fossil fuels or originate as byproducts of the aforesaid processing. The production of a raw synthesis gas from the gasification of coal is an illustrative example. Coal is a carbonaceous fossil fuel comprising a complex, extended polymeric network of compounds containing significant molar quantities of carbon (C) and hydrogen (H), along with minor molar quantities of nitrogen (N), sulfur (S) and other elements. The production of synthesis gas, a mixture of carbon monoxide and hydrogen, involves, in one method, the partial oxidation of coal with air or pure oxygen. Under appropriate conditions of temperature and pressure, the coal is volatilized to a raw synthesis gas comprising proportionately large volumes of carbon monoxide (CO) and hydrogen ($H_2$) gases, as well as smaller volumes of minor gaseous components, such as, for example, hydrogen sulfide ($H_2S$), carbon oxysulfide (COS), hydrogen cyanide (HCN), oxides of nitrogen ($NO_x$) and carbon dioxide ($CO_2$). Most of these minor gaseous components are the result of the reaction conditions used in the partial oxidation of coal for the manufacture of synthesis gas acting upon the relatively small molar amounts of nitrogen and sulfur in the carbonaceous fuel. Collectively, these minor gaseous components may be referred to as acid gases owing to their acidic nature. As defined herein, an acid gas is a gas that can form a salt upon exposure to a solution containing a base.

These so-called acid gases, when present in an acid feed gas, present a potential problem in the downstream catalytic processing of the acid feed gas. For example, synthesis gas is a useful feedstock for the production of certain commodities such as ammonia, hydrogen, hydrocarbons, methanol, and aldehydes as well as other commodities. The processes used to manufacture such commodities from synthesis gas are often carried out by subjecting a stream of synthesis gas to specific conditions of temperature and pressure in the presence of a catalyst specific for the production of a given commodity, wherein a catalyst is defined herein as a species present in a chemical reaction that accelerates the rate of a chemical reaction, e.g. the conversion of a reactant to a product, without participating in the chemical reaction. The catalyst is thereby normally only required to be present in a fractional molar quantity relative to the reactant. The catalysts employed for these processes often comprise transition metals. Unfortunately, many of the transition metals are susceptible to chemically bonding strongly with certain species that are identified as catalyst poisons, e.g. sulfur- and cyanide-containing species. The formation of these strong chemical bonds results in an irreversible deactivation of the active sites on the catalytic metal, thereby eliminating the participation of the active sites in the catalytic chemical reaction; a phenomenon commonly known as catalyst poisoning. Catalysts are present, by definition, in proportionately small relative molar amounts in a reaction mixture and are therefore susceptible to catalyst poisoning by proportionately small relative molar amounts of a catalyst poison.

An additional concern with respect to acid gases stems from the effect of their requisite acidity upon the reactivity and selectivity of the transition metal catalysts employed in downstream catalytic processing. In particular, it will be noted that the precise nature of the products produced by transition metal catalysts and the efficiency by which the transition metal catalysts carry out their transformation is markedly dependent upon the relative acidity of the immediate environment surrounding the active catalytic site. For the reasons cited above, it is desirable to remove these acid gases in as complete a manner as possible prior to any downstream processing.

Conversely, removal of some base gas component from a base feed gas stream, comprising at least one base gas and at least one nonbase gas, is desirable for reasons similar as those adduced above. For example, in the well-known hydroisomerization of certain petroleum distillates, acidic sites are required to donate free protons to effect the isomerization; acidity is therefore key to the process and removal of base gas contaminants is a vital part of preserving the integrity of the employed catalyst.

Many conventional processes extant in the art of acid gas removal utilize gas scrubbers, whereby a gas comprising an acid gas component is contacted with a basic solution and washed free of the acid gas component in the process. Pressure swing absorption is another common method used in the art, whereby a gas stream is passed over a bed of sieves in which larger gas molecules can become trapped, while allowing the smaller species, such as hydrogen, to pass through. Cryogenic distillation has also been used in the art, whereby a gas stream is cooled and liquefied in the process, the cooled mixture is then distilled to separate and remove select components from the gas stream. Previous art highlighting these and other processes will be outlined below.

In U.S. Pat. No. 5,319,924, chlorine-containing gases are removed from a synthesis gas stream by contacting the synthesis gas stream with scrubbing water comprising a solution of a base selected from the group comprising ammonia ($NH_3$), ammonium hydroxide ($NH_4OH$), sodium hydroxide (NaOH), potassium hydroxide (KOH), sodium carbonate (Na$_2$CO$_3$) and potassium carbonate (K$_2$CO$_3$). Additionally, substantially all of the sulfur-containing gases e.g. hydrogen sulfide (H$_2$S) and carbon oxysulfide (COS) are removed in a conventional acid gas removal zone comprising suitable conventional processes involving refrigeration and physical absorption with solvents, such as methanol, N-methylpyrrolidone, triethanolamine, propylene carbonate, or chemical absorption with solvents such as amines or hot potassium carbonate.

Other solvents for chemical absorption of acid gases, wherein a chemical reaction, most often salt formation, takes place between the absorption solvent and the acid gas, may also be used. For example, U.S. Pat. No. 6,207,121 B1 discloses a composition and process for removal of acid gases, wherein alkanolamines of the formula RNHCH$_2$CH (OH)CH$_2$CH$_3$ or mixtures thereof in combination with a tertiary alkanolamine are effective in the removal of acidic gases from a fluid stream containing same. In one aspect, the invention is an aqueous solution adapted for use in the removal of acidic gases from a fluid stream containing same, said aqueous solution comprising an effective amount of an alkanolamine having the formula shown above. In another aspect of the invention is a process for removing acid gases from a fluid stream containing same, said process comprising contacting said fluid stream containing acidic gases with an aqueous solution comprising an effective amount of an alkanolamine of the formula shown above. The alkanolamines are found to be effective for removing acidic gases, particularly CO$_2$, H$_2$S, COS or mixtures thereof, from a fluid stream containing same. The process of the present invention can be carried out in any conventional equipment suited for the removal of acidic gases from fluids.

U.S. Pat. No. 4,284,423 discloses a process for the separation of carbon dioxide and other acid gas components in a compound distillation column, from a gaseous mixture comprising hydrocarbon feeds containing admixtures of methane and hydrogen. It is the primary objective of this invention to provide a new and improved distillation process for the separation in a compound column of acid gas components from hydrocarbon streams. A particular object of the '423 patent is to provide a process wherein carbon dioxide can be separated from methane gas streams by distillation in a compound column, or column wherein the distillation is carried out in two or more sections (or zones) operated at different pressures. A more specific object of the '423 patent is to provide a process of such character for the more effective separation of carbon dioxide from gaseous methane streams, notably gaseous streams wherein methane is contained or provided in admixture with carbon monoxide and hydrogen. In the operation of the separation process of the '423 patent, the carbon dioxide containing feed gas is preferably introduced into the low pressure section of the column and the total pressure in this section is maintained below the critical pressure of carbon dioxide, the primary component of the liquid bottoms. In accordance with such a process it becomes feasible to effect almost complete separation of carbon dioxide and other acid gas components from a methane-containing feed gas such as natural gas or synthesis gas.

The removal of HCN by use of an absorption column and, optionally, the removal of H$_2$S, COS and CO$_2$ by conventional processes, including refrigeration and/or physical or chemical absorption, are also known in the art. U.S. Pat. No. 4,189,307 discloses a process for the production of a clean HCN-free synthesis gas from hydrocarbonaceous fuel. One embodiment of the process comprises contacting the clean gas stream with an aqueous absorbent in liquid phase in an HCN-absorption zone using a conventional gas-liquid contacting apparatus as the HCN-absorber. Fresh HCN-free aqueous absorbent is, optionally, introduced into the top of the column in order to give a final clean rinse to the gas stream that leaves the column containing substantially no HCN. Aqueous absorbents that may be used include dilute aqueous solutions of sulfuric acid, alkali carbonates, alkali bicarbonates, or mixtures thereof. In another embodiment of the process of the '307 patent, optional steps are provided for removing acid gases such as H$_2$S, COS and CO$_2$, if present in the HCN-free synthesis gas, by introduction into an acid-gas purification zone. Any suitable conventional purification process may be used to remove at least one acid gas from the HCN-free synthesis gas including, for example, refrigeration and/or physical or chemical absorption with a liquid organic solvent. Typical liquid solvent absorbents include: methanol, N-methylpyrrolidone, triethanolamine, propylene carbonate, or hot potassium carbonate.

U.S. Pat. No. 4,536,382 discloses a process that provides for; (a) the conversion of H$_2$S from a synthesis gas stream; (b) the removal of CO$_2$ from a water gas shifted synthesis gas stream and; (c) optionally, provides for the removal of minor quantities of COS from gaseous streams comprising hydrogen sulfide, hydrogen, carbon monoxide and carbon oxysulfide (COS). In particular, the process that provides for the conversion of H$_2$S from a synthesis gas stream comprises contacting a gaseous stream containing H$_2$, CO and H$_2$S with an H$_2$S-selective absorbent in an absorption zone and absorbing the bulk of the H$_2$S in said stream, thereby producing a partially purified gas stream containing a minor portion of H$_2$S. Any of the known H$_2$S-selective absorbents may be employed including aqueous solutions of alkali metal carbonates, phosphates, diethylene glycol monoethyl ether and certain alkanolamines. In an additional embodiment, the partially purified gas stream containing a minor portion of H$_2$S is subjected to conditions sufficient to provide for the water gas shift conversion of CO and water to H$_2$ and CO$_2$, thereby producing a modified gas stream having an increased ratio of H$_2$ to CO and a minor quantity of H$_2$S; said modified gas being treated under appropriate conditions with an absorbent selective for CO$_2$ in the presence of H$_2$ and CO, said absorbents including alkanolamines, sodium or potassium carbonate solutions, potassium phosphate, or solutions of sterically-hindered amines in aqueous or organic solvents, or in combinations of amines and potassium carbonate to produce CO$_2$-rich absorbent that is regenerated, the CO$_2$ being thus recovered. In yet another embodiment, the remainder of the H$_2$S in the modified gas stream is removed by contacting the stream with a specific oxidizing reactant selected from the group comprising the oxidizing polyvalent metal chelates or chelates of nitrilotriacetic acid, in particular, the chelates employing iron, copper and manganese are preferred but those employing lead, mercury, palladium, platinum, tungsten, nickel, chromium, cobalt, vanadium, titanium, tantalum, zirconium, molybdenum, and tin are also acceptable. Solutions of these metal chelates are responsible for converting H$_2$S in the modified gas stream in the contacting zone to sulfur, and recovering a substantially sulfur-free gas stream having an increased ratio of H$_2$ to CO. Additionally, an optional embodiment provides for the removal of minor quantities of COS from the streams in a COS conversion zone. The hydrolysis of COS to H$_2$S and CO$_2$ is shown by the following formula:

$$COS + H_2O \rightarrow H_2S + CO_2.$$

Water is added, in the COS conversion zone, and reacts with the COS in the presence of a preferred catalyst, such as those including the metals Ni, Pd, Pt, Co, Rh or In. Platinum on alumina is a preferred catalyst and support system. The $H_2S$ produced by hydrolysis is removed by contacting the stream with a specific oxidizing reactant as outlined hereinabove.

International application WO 99/14473 discloses a high temperature desulfurization embodiment as part of an integrated gasification combined cycle (IGCC) wherein the combustion gas that enters the high temperature desulfurization system has already had the majority of its sulfur content removed through one of the conventional low temperature desulfurization processes well known to those skilled in the art. Many of these processes include a COS hydrolysis step to increase the sulfur removal by about 1–2%. Utilizing the high temperature desulfurization system described herein eliminates the need for COS hydrolysis and removes the last traces of sulfur.

U.S. Pat. No. 6,090,356 teaches an integrated process that removes acidic gases such as $H_2S$, COS and $CO_2$ from raw synthesis gas. The process comprises separating $H_2S$ and COS from a raw synthesis gas by absorption with a liquid solvent, removing coabsorbed $CO_2$ by stripping the solvent with nitrogen, separating the $H_2S$ and COS from the solvent and recovering sulfur from the $H_2S$ and COS. This separation is accomplished by sending the synthesis gas to an acid gas recovery unit where it is first treated in a $H_2S$ absorber that uses a liquid solvent for the removal of $H_2S$. Significant amounts of $CO_2$ are also removed by the $H_2S$ solvent in the first $H_2S$ absorber. The invention also comprises operative steps for removing $CO_2$ from a shifted synthesis gas comprising $CO_2$ and $H_2$. To recover the $CO_2$ absorbed in the acid gas solvent, also referred to as the "rich solvent," the rich solvent is heated and the pressure reduced to desorb the $CO_2$.

A process for using a catalytic hydrolysis of HCN to ammonia and carbon monoxide is known for removal of HCN in feed gas. In particular, U.S. Pat. No. 5,968,465 discloses a process for removal of HCN from synthesis gas by contact with a metal oxide catalyst comprised of the oxides of molybdenum, titanium, and aluminum in the presence of water vapor, and subsequently water washing the resulting gas. Reaction conditions for HCN removal include elevated temperatures and elevated pressures, and at these conditions at least about 95% of the HCN contained in the synthesis gas feed stream is removed. Subsequent to the contacting step, the gas is scrubbed with water to remove the formed $NH_3$; the hydrolysis being necessary as ammonia is readily soluble in water while hydrogen cyanide is difficult to remove from synthesis gas because of its low solubility in common solvents, e.g., water.

U.S. Pat. No. 5,980,858 discloses a method and apparatus for treating wastes to produce synthesis gas, wherein, in one aspect of the invention, said synthesis gas is scrubbed for removal of acid gas components in a water scrubber before a water gas shift reaction. In another aspect of the invention, the process of removal of acid gas components from a water gas shifted synthesis gas produced from the wastes takes place in an acid gas remover, wherein the process of removal of acid gas components comprises a physical absorption process that is carried out to remove impurities including hydrogen sulfide ($H_2S$), carbon oxysulfide (COS), and carbon dioxide ($CO_2$).

As the current invention involves a gas permeable membrane, it will be useful to discuss the theory of membrane separations; specifically, separations of gaseous mixtures using membranes. Membranes are thin film barriers; the defining property of which is their ability to selectively allow certain components of a mixture to pass through the membrane while excluding from passage certain other components of a mixture based on differing rates of mass transport through the membrane for varying components. The exact mechanism of mass transport through a membrane is dependent upon the characteristics of that membrane; in particular, the chemical composition, the morphology of the material, and if applicable, the porosity. Nonetheless, all separations using membranes are governed by, to at least some extent, Fickian diffusion, wherein the driving force for transport of a substance is a gradient in chemical potential. The pressure differential across the membrane represents the gradient in chemical potential and therefore the driving force for diffusion through the membrane. To sum, the flux for a given component across a membrane is proportional to the pressure differential and inversely proportional to membrane thickness. Thus, most membranes are made to be very thin to attain high rates of separation.

For a mixture of two gaseous components in a feed, separation can only be effected when the partial pressure of a component in the feed exceeds the partial pressure of that same component in the permeate. Thus, membrane-mediated gas separations are also pressure-driven processes. This is typically accomplished in one of two basic ways: a high partial pressure of a component on the feed side can be achieved by realizing a high total pressure on the feed side; conversely, a low partial pressure of a component on the permeate side can be achieved by realizing a low total pressure on the permeate side. Because of the need for the continuous maintenance of a pressure differential to drive the separation in membrane mediated processes, practical membrane separations are continuous flow processes that feature the constant addition of feed at high total pressure or the constant removal of permeate at low partial pressure for the permeating component of interest.

Typical membranes are specially prepared and designed with their ultimate end use in mind. Careful control over such factors as porosity, polymer molecular weight, tensile strength and the like have led to a limited number of specialty gas permeable membranes that are offered commercially. The extensive optimization required to properly fashion a membrane of good efficiency in a separation of a specified solute has necessarily limited the number of membranes available commercially. Membranes do, however, have significant advantages over conventional separation technologies. A lack of moving parts makes them mechanically simple and energy efficient. Membranes typically arrive in modular packages and therefore require little space as compared to their conventional counterparts. A great deal of effort has been devoted to the investigation and discovery of selective membranes; indeed, nearly all useful membranes are selective for the preferential permeation of a specific component. In the case of gas permeable membranes, there exist membranes of highly specific design for the selective permeation of say, hydrogen over methane.

The use of gas permeable membranes for the separation of hydrogen, carbon monoxide and the acid gas carbon dioxide is documented in the art. For example, U.S. Pat. No. 5,322,617 discloses an improvement for the treatment of heavy oil/water emulsions with carbon monoxide under water gas shift reaction conditions, and recovering not only the upgraded heavy oils but also hydrogen and carbon dioxide. According to the '617 patent, the excess carbon monoxide may be recovered, e.g. the carbon monoxide produced may be removed by a membrane separation process. The hydrogen and carbon dioxide produced may also be recovered by a membrane separation process.

Removal of gases, including the acid gas $CO_2$, using a selective membrane has been disclosed. U.S. Pat. No. 5,647,227 to Lokhandwala teaches a membrane separation process combined with a cryogenic separation process for treating a gas stream containing methane, nitrogen and at least one other component. The membrane separation process of the '227 patent works by preferentially permeating methane and the other component and rejecting nitrogen. In one aspect, the invention of the '227 patent is a process for treating a gas stream containing methane, nitrogen and at least one other component. The process comprises a membrane separation step followed by a cryogenic separation step. The membrane step works by preferentially permeating methane and one or multiple components that might affect the cryogenic separation, and by rejecting the nitrogen component of the stream. The driving force for transmembrane permeation is provided for by a superatmospheric pressure on the feed side, a subatmospheric pressure on the permeate side, or the combination of both. The effects of the membrane separation step are two-fold: (i) to remove contaminants that might interfere with the operation of the cryogenic nitrogen/methane separation unit, such as by freezing out during refrigeration prior to entry into the distillation column or within the distillation column itself, and (ii) to reduce the volume of gas to be treated by cryogenic separation.

A process and article of manufacture for micro-distillation of acid anions including cyanide, arsenate and sulfide, by acidification of the anion in the lower elongated member of the article of manufacture and volatilization to the acid gas followed by permeation through a gas permeable membrane and collection in a caustic solution held in the upper elongated member of the article of manufacture is disclosed in U.S. Pat. No. 5,160,413. In particular, with respect to the process, a sample of the cyanide along with water and an acidifying agent is mixed together and placed in the lower elongated member. The assembled distillation apparatus is then placed in a heating member where sufficient temperature is provided to vaporize hydrogen cyanide gas from the sample mixture. The hydrogen cyanide gas passes upwardly from the lower elongated member through the permeable membrane into the upper elongated member. The upper elongated member contains a salt forming material whereby a cyanide salt is formed.

Separation and/or removal of carbon monoxide, carbon dioxide and hydrogen gases from a water shifted synthesis gas by a scrubbing process, a pressure swing absorption process or by a membrane separation process has been disclosed in U.S. Pat. No. 5,322,617. The invention is an improvement upon the treatment of heavy oil/water emulsions with carbon monoxide under water gas shift reaction conditions to recover the upgraded heavy oils, as well as hydrogen and carbon dioxide. In one feature of the invention, the carbon monoxide may be recovered, e.g. the carbon monoxide produced may be removed either by a scrubbing process, or by a pressure swing absorption process, or by a membrane separation process. The hydrogen and carbon dioxide may also be removed either by a scrubbing process, or by a pressure swing absorption process, or by a membrane separation process.

Thus, the successful removal of acid or base gases from acid or base feed gases remains a problem heretofore not completely solved by the prior art. The present invention is intended to address the deficiencies and shortcomings cited hereinabove by providing a novel process by which acid or base gases may be removed from an acid feed gas or a base feed gas, respectively.

SUMMARY OF THE INVENTION

In one embodiment, the present invention relates to a process for treating an acid feed gas whereby at least one acid gas is removed from the acid feed gas. In one aspect of this embodiment of the subject process, the acid feed gas is brought into contact with a gas permeable membrane that is in simultaneous contact with a permeate comprising a caustic solution. The gas permeable membrane, acid feed gas and permeate are arranged in such a manner as to allow for the permeation of gases between the acid feed gas and the permeate. In another aspect, at least one acid gas is removed from the acid feed gas by permeation of the acid gas through the gas permeable membrane. In yet another aspect, a chemical reaction, e.g. an acid-base reaction, of the acid gas with the caustic solution causes the formation of a salt thereby facilitating the removal of the acid gas from the acid feed gas.

An alternate embodiment comprises a process for treating a base feed gas whereby at least one base gas is removed from the base feed gas. In one aspect, the base feed gas is brought into contact with a gas permeable membrane that is in simultaneous contact with a permeate comprising an acidic solution. The gas permeable membrane, base feed gas and permeate are arranged in such a manner as to allow for the permeation of gases between the base feed gas and the permeate. In another aspect, at least one base gas is removed from the base feed gas by permeation of the base gas through the gas permeable membrane. In yet another aspect, a chemical reaction, e.g. an acid-base reaction, of the base gas with the acidic solution causes the formation of a salt, thereby facilitating the removal of the base gas from the base feed gas.

In another aspect of the present invention is presented an apparatus for treating a feed gas containing an acid or a base gas wherein the apparatus comprises a feed gas passage; a treatment solution container containing a treatment solution; and a gas permeable membrane.

DETAILED DESCRIPTION OF THE INVENTION

Definitions

As defined herein, an acid feed gas is any gas or gaseous mixture comprising at least one acid gas and at least one nonacid gas, where an acid gas is defined as a gas that can form a salt upon exposure to a solution containing a base. As defined herein, a base feed gas is any gas or gaseous mixture comprising at least one base gas and at least one non-base gas, where a base gas is defined as a gas that can form a salt upon exposure to a solution containing an acid. As defined herein a gas permeable membrane is a barrier having the property of allowing for the transport through the barrier of at least one gaseous component at a reasonable rate while retarding the transport through the barrier of nongaseous components at a sufficiently slow rate as to effectively preclude transport of the nongaseous components. A permeate is defined herein as a phase that exists on that side of the membrane which is opposite the side on which the base feed gas or acid feed gas exists; said phase comprising the components that permeate through the membrane from the base feed gas or acid feed gas. As defined herein, a caustic solution is any solution that comprises at least one base and, optionally, at least one solvent; in particular, a caustic solution may be defined as comprising at least one organic or inorganic base alone, or combination thereof, and optionally, dissolved in an organic or inorganic solvent, or combinations thereof. As defined herein, an acidic solution is any solution that comprises at least one acid and, optionally, at least one solvent; in particular, an acidic solution may be defined as comprising at least one organic or inorganic acid alone, or combination thereof, and optionally, dissolved in an organic or inorganic solvent, or combinations thereof.

Although the present invention is described primarily in terms of an embodiment relating to an Acid Feed Gas, it will be appreciated by one of normal skill in the art that what is written can apply equally well to an alternate embodiment utilizing a Base Feed Gas.

Acid Gas Removal

One embodiment of the present invention relates to a process for treating an acid feed gas whereby at least one acid gas is at least 50% removed from the acid feed gas. Although any acid feed gas can be used in this embodiment of the subject process, some examples of preferred acid feed gases include those having at least one hydrocarbon and at least one acid gas, for example, mixtures of $CO_2$ and $CH_4$; particularly preferred acid feed gases are those resulting from the partial oxidation of a carbonaceous or hydrocarbonaceous fuel, such as, for example, synthesis gas comprising CO and $H_2$. An acid feed gas for which the present invention is particularly well suited is a raw, sour synthesis gas primarily comprising carbon monoxide and hydrogen gases and having the following acid gases present in any amount: hydrogen cyanide (HCN); hydrogen sulfide ($H_2S$); carbon oxysulfide (COS); carbon dioxide ($CO_2$); and nitrogen oxides ($NO_x$)

In one aspect, the acid feed gas is brought into contact with a gas permeable membrane that is in simultaneous contact with a permeate comprising a caustic solution; the gas permeable membrane, acid feed gas and permeate being arranged in such a manner as to allow for the permeation of gases between the acid feed gas and the permeate. Gas permeable membranes constructed of any suitable material or materials may be used in the subject process, including those made of; physical solids, such as, for example, metals, ceramics and the like; homogeneous films, such as, for example, polymers, metals and the like; heterogeneous solids, such as, for example, polymer mixes, mixed glasses, and the like; polymer solutions; and asymmetric structures and liquids. Preferred materials for the gas permeable membranes of the subject process include the group of organic polymers comprising polysulfones, cellulose esters, polyimides, halogenated polycarbonates, fluoropolymers, and the like. A particularly preferred material for the gas permeable membrane used in the subject process is polytetrafluoroethylene (Teflon™).

Among the bases that may be employed in the caustic solution are, for example, the hydroxides and alkoxides of the alkali and alkaline earth metals; some examples are sodium hydroxide, potassium hydroxide, sodium isopropoxide, potassium tert-butoxide, and the like. Preferred bases are the amines including ammonia, trimethylamine, triethylamine, diisopropylamine, diisopropylethylamine, and the like. Among the solvents that may be used are alcohols and water. A particularly preferred caustic solution comprises triethylamine in water.

In one embodiment of the present method, at least one acid gas is preferably at least 75% removed from the acid feed gas; more preferably, at least 90% removed from said feed gas. In a more preferred embodiment, more than one acid gas is preferably at least 50% removed from said feed gas; more preferably, more than one acid gas is at least 75% removed from said feed gas; and most preferably, more than one acid gas is at least 90% removed from said feed gas. In a most preferred embodiment, all acid gases are preferably at least 50% removed from the acid feed gas; more preferably, at least 75% removed from said feed gas; and most preferably, at least 90% removed from said feed gas.

In another embodiment of the subject process, a chemical reaction, e.g. an acid-base reaction, of the acid gas with the caustic solution causes the formation of a salt, thereby facilitating the removal of the acid gas from the acid feed gas. Among the salts that may be formed are the primary, secondary, tertiary and quaternary ammonium salts as well as the alkali and alkaline earth salts of the acid gases. These salts may be collected by any suitable method including treatment of the permeate. One advantage of this embodiment includes the ability to recycle and regenerate the caustic solution.

Base Gas Removal

Many aspects and components described above in connection with respect to acid gas removal apply equally well to base gas removal. However, certain aspects of the alternate embodiment are substantially different and are thus described hereinbelow.

In an alternate embodiment, a process for treating a basic feed gas whereby at least one base gas is removed from the base feed gas is presented. Although any base feed gas can be used in this alternate embodiment of the subject process, some examples of preferred base feed gases include those having at least one hydrocarbon and at least one base gas, as for example, mixtures of ammonia ($NH_3$) and methane ($CH_4$).

In an alternate embodiment, the base feed gas is preferably brought into contact with a gas permeable membrane that is in simultaneous contact with a permeate comprising an acidic solution. Acids that are suitable for use in said acidic solutions are, for example, the common mineral acids; some examples are hydrochloric (HCl), hydrobromic (HBr), sulfuric ($H_2SO_4$), nitric ($HNO_3$) and the like. Other weaker acids may also be used including acetic ($CH_3CO_2H$), phosphoric ($H_3PO_4$) and the like. Water may be used as a solvent.

It will be appreciated that either embodiment of the subject process can be run as a continuous flow process, in which either or both of the acid or base feed gas and the permeate is a stream flowing continuously past the membrane. Likewise, the feed gas stream and the permeate stream can be oriented with respect to each other in cross-current, countercurrent or cocurrent fashion. The permeate stream may be within a closed loop cycle. One advantage of the present process is the effect of the caustic solution on the removal of an acid gas. Unlike conventional separation processes that use a gas permeable membrane, it is not limited with respect to the volume fraction of solute that can be removed from the feed; a pressure differential with respect to the partial pressure of the solute in the feed and the partial pressure of the solute in the permeate being required to maintain a gradient in chemical potential by which separation across the membrane can occur. Although the present invention utilizes a pressure differential, the inventive method further features the utilization of acid-base equilibrium. The caustic reacts only with the acid gases to form the corresponding salt while permitting for the return back to the feed of nonacid gases that have not reacted with the caustic solution. Without wishing to be bound by any particular theory, it is believed that the equilibrium thus formed behaves as a supplementary driving force, pushing the extraction of acid gases nearer to a state of total removal from the acid feed gas. The effect in the case of, for instance, synthesis gas, is to remove all manner of acid gases, e.g. HCN, $H_2S$, COS, $CO_2$, $NO_x$, while returning the nonacid components, e.g. CO and $H_2$, back to the feed gas stream. It will also be duly noted that this same mechanistic rationale can be extended with equivalent meaning to separations of base gas components from base gas feeds employing acidic solutions.

There exist many suitable ways in which to arrange the gas permeable membrane, feed gas and permeate that will allow for the permeation of gases between the feed gas and the permeate. Suitable arrangements may, or may not, employ modules, wherein a module is defined herein as the smallest unit commercially available possessing the type of membrane desired for the subject process. Some examples of available module types include hollow fiber-capillary, tubular, monolith, spiral and plate and frame.

Another advantage of the present process, is the lack of energy intensive cooling or heating steps, as are typically required in comparable distillation processes. Still another advantage of the present process over typical gaseous membrane mediated separations is the elimination of a selectivity requirement. By using a nondiscriminating membrane in conjunction with a solution capable of forming salts, an enriched residual gas stream, substantially free of undesirable components, is produced. These gases are suitable for downstream processing without the need for further purification.

Apparatus

In another aspect of the present invention is presented an apparatus for treating a feed gas containing an acid or a base gas wherein the apparatus comprises a feed gas passage; a treatment solution container containing a treatment solution; and a gas permeable membrane. The gas permeable membrane separates the treatment solution container from the feed gas passage such that when the feed gas is in the passage it is in contact with the gas permeable membrane in such a manner as to allow the permeation of gases between the feed gas and the treatment solution, such that at least a portion of the acid or base gas permeates through said gas permeable membrane and reacts with said treatment solution, said reaction of said base gas with said acidic solution causing the formation of a salt.

It will be appreciated by those of normal skill in the art that there are variations of the process that can be envisaged that would not appreciably depart from the scope of this on.

What is claimed is:

1. A process for treating an acid feed gas, comprising:
   bringing the acid feed gas into contact with a gas permeable membrane;
   said gas permeable membrane being in simultaneous contact with a permeate comprising a caustic solution in such a manner as to allow for the permeation of gases between said acid feed gas and said permeate, wherein the acid feed gas and the permeate are on opposite sides of the gas permeable membrane;
   wherein at least one acid gas is at least 50% removed from said acid feed gas by permeation of said acid gas through said gas permeable membrane and reaction of said acid gas with the caustic of said caustic solution of said permeate on the permeate side of the gas permeable membrane;
   and wherein said reaction produces a salt.

2. The process according to claim 1 wherein the feed gas comprises at least one hydrocarbon and at least one acid gas.

3. The process according to claim 2 wherein the feed gas comprises carbon dioxide ($CO_2$) and methane ($CH_4$).

4. The process according to claim 2 wherein the feed gas comprises natural gas.

5. The process according to claim 2 wherein the feed gas comprises a raw, sour natural gas.

6. The process according to claim 1 wherein the feed gas comprises synthesis gas.

7. The process according to claim 1 wherein the feed gas comprises a raw, sour synthesis gas.

8. The process according to claim 1 wherein the gas permeable membrane comprises an organic polymer.

9. The process according to claim 8 wherein the gas permeable membrane comprises at least one selected from the group consisting of organic polymer blend, organic polymer solution, fluorine-containing organic polymer, polycarbonate polymer, halogen-containing polycarbonate polymer, cellulose ester polymer, polysulfone polymer, and polyimide polymer.

10. The process according to claim 1 wherein the gas permeable membrane comprises a polytetrafluoroethylene polymer.

11. The process according to claim 1 wherein the gas permeable membrane comprises fluoropolymer.

12. The process according to claim 1 wherein the gas permeable membrane comprises an inorganic polymer.

13. The process according to claim 12 wherein the gas permeable membrane comprises at least one selected from the group metal, ceramic, glass, caulked membrane, palladium, palladium alloy, silver, carbon molecular sieves, and porous metal oxide.

14. The process according to claim 1 wherein the gas permeable membrane is in a configuration selected from the group hollow fiber and flat-sheet.

15. The process according to claim 1 wherein the caustic solution comprises a base chosen from the group consisting of alkali metal hydroxides, alkalki metal alkoxides, alkaline earth metal hydroxides and alkaline earth metal alkoxides.

16. The process according to claim 1 wherein the caustic solution comprises an organic base.

17. The process according to claim 16 wherein the organic base is an amine.

18. The process according to claim 17 wherein the amine is triethylamine.

19. The process according to claim 1 wherein the caustic solution comprises a water solvent.

20. The process according to claim 1 wherein the caustic solution comprises an alcohol solvent.

21. The process according to claim 1 wherein the caustic solution comprises triethylamine in water.

22. The process according to claim 1 wherein the direction of flow of feed gas with respect to the direction of flow of permeate is selected from the group crosscurrent, cocurrent and countercurrent.

23. The process according to claim 1 wherein at least one acid gas is at least 75% removed from said feed gas.

24. The process according to claim 1 wherein at least one acid gas is at least 90% removed from said feed gas.

25. The process according to claim 1 wherein more than one acid gas is at least 50% removed from said feed gas.

26. The process according to claim 1 wherein more than one acid gas is at least 75% removed from said feed gas.

27. The process according to claim 1 wherein more than one acid gas is at least 90% removed from said feed gas.

28. The process according to claim 1 wherein all acid gases present in a feed gas are at least 50% removed from said feed gas.

29. The process according to claim 1 wherein all acid gases present in a feed gas are at least 75% removed from said feed gas.

30. The process according to claim 1 wherein all acid gases present in a feed gas are at least 90% removed from said feed gas.

31. The process according to claim 1 wherein the feed gas comprises at least one gas selected from the group consisting of hydrogen sulfide ($H_2S$), carbon oxysulfide (COS), carbon dioxide ($CO_2$), the oxides of nitrogen ($NO_x$) hydrogen cyanide (HCN) and combinations thereof.

32. The process according to claim 1 wherein the salt is recovered.

33. A process for treating a base feed gas, comprising:
bringing the base feed gas into contact with a gas permeable membrane;
said gas permeable membrane being in simultaneous contact with a permeate comprising an acidic solution in such a manner as to allow for the permeation of gases between said base feed gas and said permeate, wherein the base feed gas and the permeate are on opposite sides of the gas permeable membrane;
wherein at least one base gas is at least 50% removed from said base feed gas by permeation of said base gas through said gas permeable membrane and reaction of said base gas with the acid of said acidic solution of said permeate on the permeate side of the gas permeable membrane;
and wherein said reaction produces a salt.

34. The process according to claim 33 wherein the feed gas comprises at least one hydrocarbon and at least one base gas.

35. The process according to claim 34 wherein the feed gas comprises ammonia ($NH_3$) and methane ($CH_4$).

36. The process according to claim 34 wherein the feed gas comprises natural gas.

37. The process according to claim 34 wherein the feed gas comprises a raw, sour natural gas.

38. The process according to claim 33 wherein the feed gas comprises synthesis gas.

39. The process according to claim 33 wherein the feed gas comprises a raw, sour synthesis gas.

40. The process according to claim 33 wherein the gas permeable membrane comprises an organic polymer.

41. The process according to claim 40 wherein the gas permeable membrane comprises at least one selected from the group consisting of organic polymer blend, organic polymer solution, fluorine-containing organic polymer, polycarbonate polymer, halogen-containing polycarbonate polymer, cellulose ester polymer, polysulfone polymer, and polyimide polymer.

42. The process according to claim 33 wherein the gas permeable membrane comprises a polytetrafluoroethylene polymer.

43. The process according to claim 33 wherein the gas permeable membrane comprises fluoropolymer.

44. The process according to claim 33 wherein the gas permeable membrane comprises an inorganic polymer.

45. The process according to claim 44 wherein the gas permeable membrane comprises at least one selected from the group metal, ceramic, glass, caulked membrane, palladium, palladium alloy, silver, carbon molecular sieves, and porous metal oxide.

46. The process according to claim 33 wherein the gas permeable membrane is in a configuration selected from the group hollow fiber and flat-sheet.

47. The process according to claim 33 wherein the acidic solution comprises at least one acid selected from the group consisting hydrochloric (HCl), hydrobromic (HBr), sulfuric ($H_2SO_4$), nitric ($HNO_3$), acetic ($CH_3CO_2H$), and phosphoric ($H_3PO_4$).

48. The process according to claim 33 wherein the acidic solution comprises a water solvent.

49. The process according to claim 33 wherein the direction of flow of feed gas with respect to the direction of flow of permeate is selected from the group crosscurrent, cocurrent and countercurrent.

50. The process according to claim 33 wherein at least one base gas is at least 75% removed from said feed gas.

51. The process according to claim 33 wherein at least one base gas is at least 90% removed from said feed gas.

52. The process according to claim 33 wherein more than one base gas is at least 50% removed from said feed gas.

53. The process according to claim 33 wherein more than one base gas is at least 75% removed from said feed gas.

54. The process according to claim 33 wherein more than one base gas is at least 90% removed from said feed gas.

55. The process according to claim 33 wherein all base gases present in a feed gas are at least 50% removed from said feed gas.

56. The process according to claim 33 wherein all base gases present in a feed gas are at least 75% removed from said feed gas.

57. The process according to claim 33 wherein all base gases present in a feed gas are at least 90% removed from said feed gas.

58. The process according to claim 33 wherein the salt is recovered.

* * * * *

UNITED STATES PATENT AND TRADEMARK OFFICE
CERTIFICATE OF CORRECTION

PATENT NO.         : 6,998,098 B2                                                   Page 1 of 1
APPLICATION NO. : 10/292030
DATED              : February 14, 2006
INVENTOR(S)        : Joe D. Allison It is certified that error appears in the above-identified patent and that said Letters Patent is hereby corrected as shown below:

Column 11, line 48, after "the" and before "process" insert --present--.

Column 11, line 49, after "this" delete "on" and insert --invention--.

Signed and Sealed this

Tenth Day of October, 2006

JON W. DUDAS
*Director of the United States Patent and Trademark Office*